United States Patent [19]

Ohmura

[11] Patent Number: 4,702,032
[45] Date of Patent: Oct. 27, 1987

[54] CYLINDRICAL REEL SEAT FOR A FISHING ROD

[75] Inventor: Ryuichi Ohmura, Shizuoka, Japan

[73] Assignee: Fuji Kogyo Co., Ltd., Shizuoka, Japan

[21] Appl. No.: 837,819

[22] Filed: Mar. 10, 1986

[30] Foreign Application Priority Data

Jun. 17, 1985 [JP] Japan .............................. 60-90086[U]

[51] Int. Cl.⁴ ............................................. A01K 87/00
[52] U.S. Cl. ............................................. 43/22; 43/23
[58] Field of Search ................................ 43/20, 22, 23

[56] References Cited

U.S. PATENT DOCUMENTS

| | | | |
|---|---|---|---|
| 942,030 | 11/1909 | Austin | 43/22 |
| 1,035,936 | 8/1912 | Anderson | 43/22 |
| 1,159,466 | 11/1915 | Bristow | 43/22 |
| 1,464,154 | 8/1923 | Hooper | 43/22 |
| 3,410,016 | 11/1968 | Arsenault | 43/22 |
| 3,410,017 | 11/1968 | Wilson | 43/22 |
| 3,913,348 | 8/1976 | Shell | 43/23 |
| 4,133,133 | 1/1979 | Casset | 43/22 |

Primary Examiner—M. Jordan
Assistant Examiner—Carmine Cuda
Attorney, Agent, or Firm—Holman & Stern

[57] ABSTRACT

A cylindrical reel seat for a fishing rod comprising a cylindrical body having a cavity which receives one end of a reel base; a slidable sleeve adapted to fasten another end of the reel base; a reel base mount formed at the top of the cylindrical body; and a soft member covering the surface of the cylindrical body except the reel base mount, the range of sliding of the slidable sleeve and the hood portion of the cavity. The cylindrical body is provided with flanges adapted to hold the end and edges of the soft member.

5 Claims, 6 Drawing Figures

CYLINDRICAL REEL SEAT FOR A FISHING ROD

BACKGROUND OF THE INVENTION

1. Field of the Invention

The present invention relates to a reel seat for fishing rod. More particularly, the invention relates to a reel seat for fishing which has a good feeling of grip.

2. Description of the Prior Art

A conventional reel seat shown in FIG. 5 comprises a cylindrical body 2 into which a fishing rod 1 is inserted, a reel base mount 3 formed on the upper surface of said cylindrical body 2, a sleeve 4 being provided at one end ( for example, an end near a grip ) of said reel base mount 3, said sleeve 4 having a cavity 4a into which one end of a reel base is inserted, a slidable sleeve 5 having the cavity 5a into which another end of the reel base is inserted, said slidable sleeve 5 for fastening the reel base to the reel base mount 3, a nut 7 engaged with a threaded portion 6 so as to slide said slidable sleeve 5, both of said slidable sleeve and said nut 7 being provided at same end of said reel base mount 3. Such a conventional reel seat has a bad feeling of grip, because of steps being formed by sleeves on the cylindrical body. Therefore, as shown in FIG. 6, it is desirable that the cylindrical body 2 is often covered with two soft members 9a, 9b which abut one another so as to form a hole 8 in the center through which hole a reel support (not shown ) is passed. As above, such soft member gives a soft feeling of grip but they, increase the outside diameter and make the reel seat hard to grasp. If the outside diameter is decreased to make the reel seat easy to grasp, the cylindrical body of the reel seat has to be made thin , and the rod capacity is decreased as a result thereof.

SUMMARY OF THE INVENTION

The present invention intends to obviate the above-mentioned disadvantages of the prior art while maintaining a good feeling of grip. In view of the fact that a fixed sleeve and the slidable sleeve protrude from the cylindrical body, the surface of the reel seat except these sleeves is covered with a soft member so that the whole reel seat gives a soft, smooth feeling of grip and its outside diameter is not increased by the soft member.

In the present invention, the conventional fixed sleeve having said cavity is reduced to a cavity portion at the top by removing the side and bottom portions of the fixed sleeve, said cavity portion being formed integrally with the cylindrical body, said removed portions of the fixed sleeve being replaced by the soft member, said soft member being extended nearly to the range of sliding of the slidable sleeve, thereby steps on the surface of the cylindrical body caused by the sleeves are eliminated. The cylindrical body has flanges which receive the end and edges of the soft member. The flanges are continuously formed on both lateral sides of the reel base mount, at the rear of the cavity, and at a U-shaped portion of a circumference of the cylindrical body facing away from the open end of the slidable sleeve. The flanges are provided inside with recesses which hold the end and edges of the soft member. Thereby, the end and edges of the soft member are protected from being broken or peeled off. If the soft member is extended rearward so as to form a rear grip integrally and continuously therewith,it is possible to produce an unitary looking handle at a low cost.

It is the first object of the present invention to provide a cylindrical reel seat giving a soft, smooth feeling of grip and having a not large outside diameter.

It is the second object of the present invention to provide a reel seat in which the end and edges of the soft member are protected from being broken or peeled off.

It is the third object of the present invention to provide a less expensive grip handle giving an unitary looking handle by extending the soft member rearward so as to form a rear grip integrally and continuously therewith.

It is the final object of the present invention to provide a reel seat which is so formed as to be easily covered with the soft member.

BRIEF DESCRIPTION OF THE DRAWINGS

Preferred embodiments of the invention—illustrative of the reel seat in which the application has contemplated applying the principles—are set forth in the following description and shown in the drawings and are particularly set forth in the appended claims.

DESCRIPTION OF PREFERRED EMBODIMENTS

Figure 1:
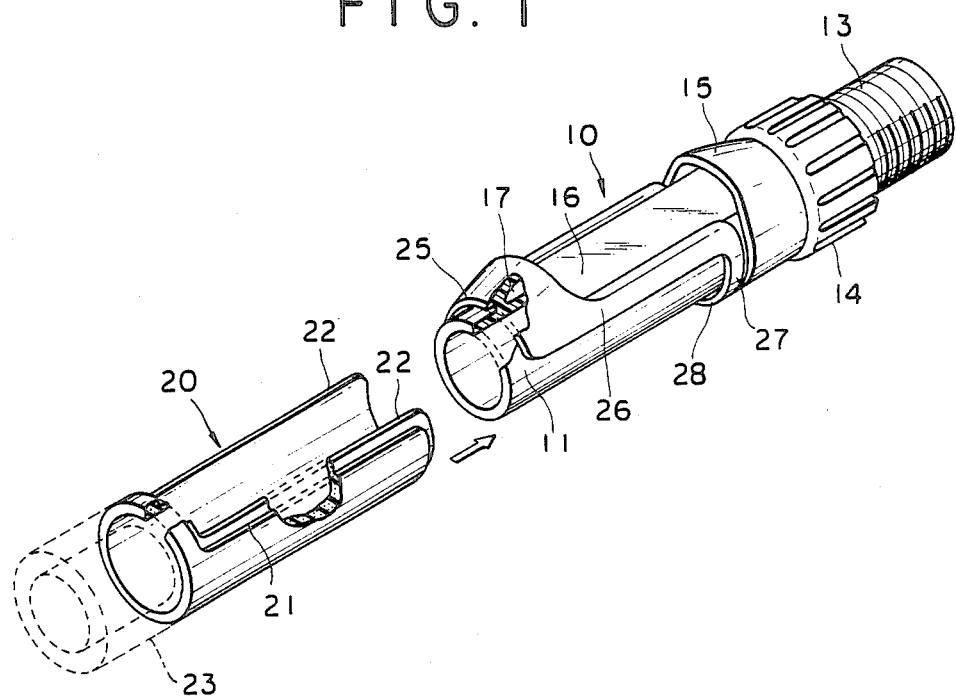
FIG. 1 is a perspective view of a cylindrical reel seat for fishing according to the present invention.

The lower half portion of a cylindrical reel seat 10 is fitted with a soft member 20 as shown by the arrow in FIG. 1. The cylindrical reel seat 10 comprises a cylindrical body 11, a nut 14 engaged with a threaded portion 13 of the cylindrical body 11, and a slidable sleeve 15 adapted to be slid forward and backward by the nut 14. The cylindrical body 11 is provided on its top with a reel base mount 16 on which a reel base is mounted. The cylindrical body 11 is also provided at the rear end of the reel base mount 16 with a cavity portion having a cavity 17 which receives one end of said reel base, said cavity portion replacing the conventional fixed sleeve.

Figure 2:
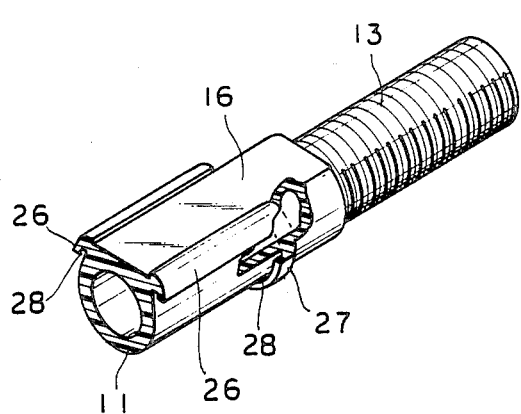
FIG. 2 is a partially cutaway view in perspective of said reel seat.
Figure 4:
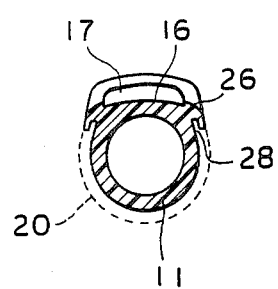
FIG. 4 is a sectional view taken on line IV—IV of FIG. 3.
Figure 3:
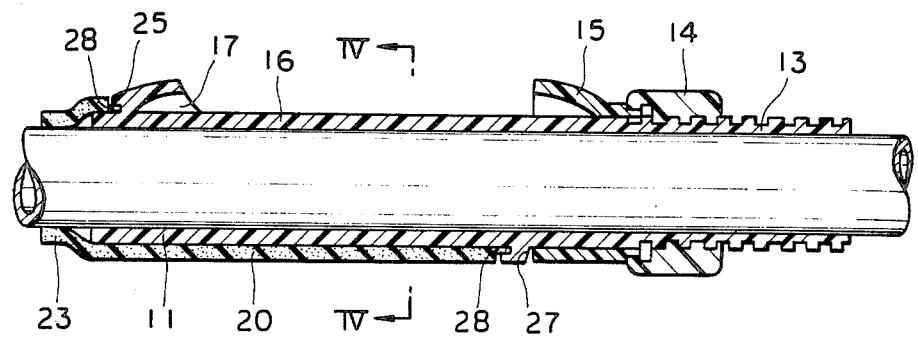
FIG. 3 is a longitudinal sectional view of said reel seat.
Figure 5:
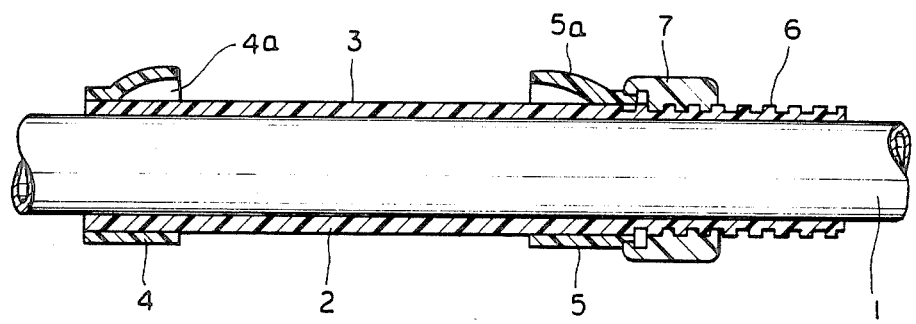
FIGS. 5 and 6 are sectional views of a conventional reel seat.
Figure 6:
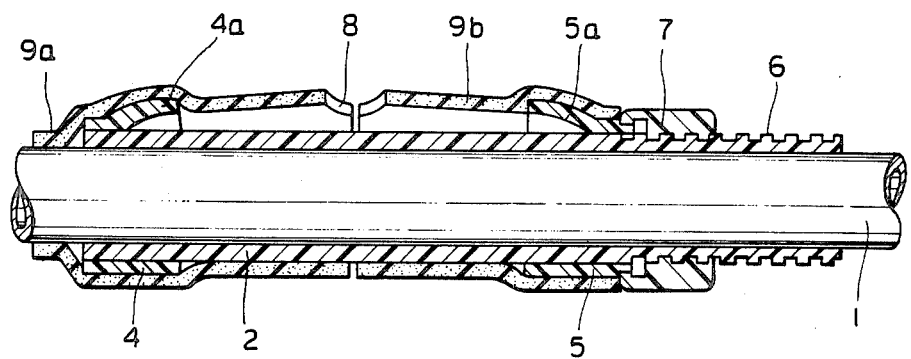

The cylindrical body 11 is further provided with flanges 25, 26, 27 which receive the end and edges 21 of the soft member 20. The flange 25 is formed at the rear of said cavity 17. The side flanges 26 extend from both ends of the flange 25, along the lateral sides of the reel base mount 16, nearly to the range of sliding of the slidable sleeve 15. The front flange 27 is formed in a shape resembling the letter "U" at a circumference of the cylindrical body 11 so as to wrap about the cylindrical body 11 with the upper arms of the U-shaped flange 27 being continuous with the front ends of the side flanges 26. The "open" portion of the U-shaped flange 27 is disposed adjacent the reel base mount 16. Each of the flanges 25, 26, 27 is provided inside with a recess 28 which firmly holds said soft member 20 ( See FIGS. 2,3 and 4.), and the soft member 20 has projections 22 corresponding to the recesses 28. Numeral 23 in FIGS. 1 and 3 represents a rear grip formed integrallY with the soft member 20. Alternatively, the rear grip 23 may be separate from the soft member 20 covering the cylindrical body 11.

The soft member 20 covers the surface of the cylindrical body 11 except the reel base mount 16, the range of sliding of the slidable sleeve 15 and the hood portion of the cavity 17. The soft member 20 has a shape resembling a trough with an annular rear end as shown in FIG. 1. The soft member 20 is made of a material pleasant to the touch, such as foamed urethane, cork, leather or other sheet and is fixed to the cylindrical body 11 by means of an adhesive.

In the present invention, as mentioned above, the conventional fixed sleeve is reduced to the hood portion at the top by removing the side and bottom portions of the fixed sleeve, said hood portion being formed integrally with the cylindrical body, said removed portions of the fixed sleeve being replaced by the soft member, said soft member being extended nearly to the range of sliding of the slidable sleeve. Thereby, the steps on the surface of the cylindrical body are eliminated. Also, the reel seat gives a soft, smooth feeling of grip and has a not large outside diameter.

Since the cylindrical body is provided with the flanges having the recesses in which the end and edges of the soft member are held, said end and edges thereof are protected from being broken or peeled off and when the soft member is extended rearward so as to form a grip integrally and continuously therewith, it is possible to obtain a less expensive handle which gives a feeling of one body. Furtheremore, the specific nature of the present invention, a reel seat is so formed as to be easily covered with the soft member.

What is claimed is:

1. A cylindrical reel seat for a fishing rod comprising: a cylindrical body having at its top a reel base mount, one end of said mount having a cavity which receives one end of a reel base; said cylindrical body being adapted to receive a relatively soft member at a circumference thereof; said relatively soft member having a trough shaped portion with an annular rear end; a slidable sleeve having an open end, said slidable sleeve being adapted to fasten another end of said reel base to said cylindrical body; a nut adapted to slide said slidable sleeve forward and backward; flanges integrally formed on said cylindrical body to receive projections connecting to said trough shaped portion of said soft member; and said soft member covering said cylindrical body except said reel base mount.

2. A cylindrical reel seat for a fishing rod as claimed in claim 1, wherein said flanges are continuously formed on the rear, both lateral sides and the front of said reel base mount, a rear flange formed in an arch shaped at a periphery of said cylindrical body at the rear of said cavity, side flanges extending from both ends of said rear flange along the lateral sides of said reel base mount, a front flange formed in a U-shaped portion at a circumference of said cylindrical body facing away from the open end of said slidable sleeve, and being continuous with the front ends of said side flanges, and said flanges being provided inside with recesses to receive the projections of said soft member.

3. A cylindrical reel seat for a fishing rod comprising a cylindrical body provided at its top with a reel base mount and at one end of said mount with a cavity which receives one end of a reel base; a slidable sleeve adapted to fasten another end of said reel base to said cylindrical body; a nut adapted to slide said slidable sleeve forward and backward; a soft member having a trough shaped portion and an annular rear end, said trough shaped portion having projections on its lateral sides; the soft member covers the surface of said cylindrical body except said reel base mount, the range of sliding of said slidable sleeve and the cavity; and flanges formed on said cylindrical body so as to receive said projections of said soft member, said flanges being continuously formed on both lateral sides of said reel base mount, at the rear of said cavity, and at a U-shaped portion of a circumference of said cylindrical body facing away from the end of said slidable sleeve, said flanges being provided inside with recesses which hold said projections of said soft member covering said cylindrical body.

4. A cylindrical reel seat for a fishing rod as claimed in claim 3, wherein said relatively soft member extends rearwardly so as to form a rear grip integrally therewith.

5. A cylindrical reel seat for a fishing rod as claimed in claim 3, wherein said relatively soft member is a material which is adapted for use as a handgrip.

* * * * *